April 18, 1967   T. O. ANDERSON ET AL   3,314,498
INTEGRATED INDICATION OF SEISMIC WELL LOGGING SIGNALS
Filed Nov. 25, 1964                                2 Sheets-Sheet 2

INVENTORS
TERRY O. ANDERSON
BRUCE A. BLACKMAN
ROBERT H. WINN

BY

ATTORNEYS

United States Patent Office 3,314,498
Patented Apr. 18, 1967

3,314,498
INTEGRATED INDICATION OF SEISMIC WELL LOGGING SIGNALS
Terry O. Anderson, Bruce A. Blackman, and Robert H. Winn, Duncan, Okla., assignors to Halliburton Company, Duncan, Okla., a corporation of Delaware
Filed Nov. 25, 1964, Ser. No. 413,870
1 Claim. (Cl. 181—0.5)

This invention relates to methods and apparatus for seismic well logging and is particularly directed to unique and distinctive information presentation affording direct analysis of certain characteristics of underground formations.

Seismic well logging employs a recurrently operative electrical-mechanical pulse transducer to generate periodic seismic pulses. This transmitter is incorporated in a sonde which is lowered into the well on a hoisting cable usually carrying one or more insulated electrical conductors to permit recording operations at the surface. The sonde also carries, as a receiver spaced from the transmitter, a mechanical-electrical transducer for detecting the transient seismic signals resulting from operation of the transmitter.

In seismic well logging, the bore is fluid filled and transmits the seismic pulses from the active transducer to the wall of the bore. In the fluid, the mechanical energy is transmitted as a compressional wave, but as it enters the solid structure it excites a diversity of modes of wave energy, including also transverse waves, and it is believed, tube waves. Substantial energy is transmitted into the formation, which later re-radiates it to the fluid whence it is detected by the receiver.

The log information signals thus obtained are of appreciated utility. They have, for instance, been recorded as successive adjacent traces on film or other sensitive surfaces for visual analysis. Conventionally, recordings of intensity modulation of a cathode ray tube to whose grid the received signals are applied afford important data to the petroleum engineer. Alternatively, the received signal may be applied to deflection plates of a cathode ray tube whereby the raw data is plotted orthogonally to the time base in adjacent traces as the sonde is traversed through the well. As will also be appreciated, the raw data may be magnetically or otherwise recorded and later transferred to a visual record in the manners just mentioned.

A great deal of information is contained in seismic logs of this nature. Some of the information, however, is yielded only by laborious analysis, if at all. In particular, the energy level at which the various successive components of the received signal is being obtained presents extreme difficulty for accurate visual estimation, especially where the received signals are not coherent in phase from one pulse to the next. For intensity modulated logs, under some circumstances of recording, it is obvious that this data is only marginally present. For deflection modulated logs, such data can be calculated in some circumstances, but only by very time consuming effort. The method and apparatus of the present invention produces a log which immediately affords, by visual observation, an indication of the rate at which incoming energy or related characteristics are being received, and more importantly, immediately indicates where transmission of such parameters are changing in the formation. The numerical values of these parameters and their rate of increase may, moreover, be numerically determined by simplified mensuration of logs produced by the present invention. Thus, geometrical measurement of a displacement from a base line, or the angle of a portion of the trace with respect thereto, will directly yield important data related to the physical nature of the formation.

Logs of the present invention are particularly significant in respect to determining transmission characteristics of the formation for seismic disturbances of individual modes. The magnitudes and variations of these characteristics are related to the type of formation, its structural features such as fractures intersecting the bore, and possibly its porosity and pore contents, if any.

It is therefore an object of this invention to provide a novel method and system for seismic well logging by which data relating to attenuation characteristics of formations may be graphically presented for visual evaluation and simplified mensuration.

A further object of the present invention is to provide a novel method and apparatus for the production of a unique form of seismic well log for graphically displaying and readily revealing certain types of information regarding the structures surrounding a well bore.

In the practice of the present invention, each received seismic signal resulting from the transmitted impulse is subjected to integration continuously over the period during which significant formation information is being detected. This portion of the signal, during the logging operation or subsequent thereto if recordings are employed, therefore provides for each cycle of the logging operation an increasing integral whose instantaneous value is plotted for direct visual observation. The signal characteristic under integration may be power, or related parameters such as voltage or current. In the preferred embodiment of the invention, it is convenient to rectify the signal and integrate the voltage. Under this procedure, full wave rectification is desirable. The resulting integral is displayed on the ultimate log as a deflection, orthogonal to a time base, having the instantaneous value of the integral. Under these circumstances, the deflection in any point along the time base represents the accumulated signal characteristic received after initiating the integration, and the slope of the indication indicates the rate of reception for the point on the time base at which the slope of the indication is taken.

The invention provides, moreover, that successive integral traces be displayed or recorded along spaced juxtaposed time base loci. Therefore, variations in seismic wave attenuation in the formation can be immediately recognized from the configuration of the pattern of the traces on the log. Direct numerical mensuration at such points of interest, or elsewhere, is a simple geometrical procedure.

Although the invention is not to be limited except by the scope of the appending claim, further details of the invention, as well as additional objects and advantages, will be more readily perceived in connection with the following detailed description of a representative embodiment of the invention, taken together with the accompanying drawings wherein:

The present invention may be practiced in connection with a wide variety of seismic logging system. The preferred arrangement hereinafter described is closely related to that disclosed in application Ser. No. 331,598, filed Dec. 18, 1963, for Well Logging, to which reference may be had for further description.

Figure 1:
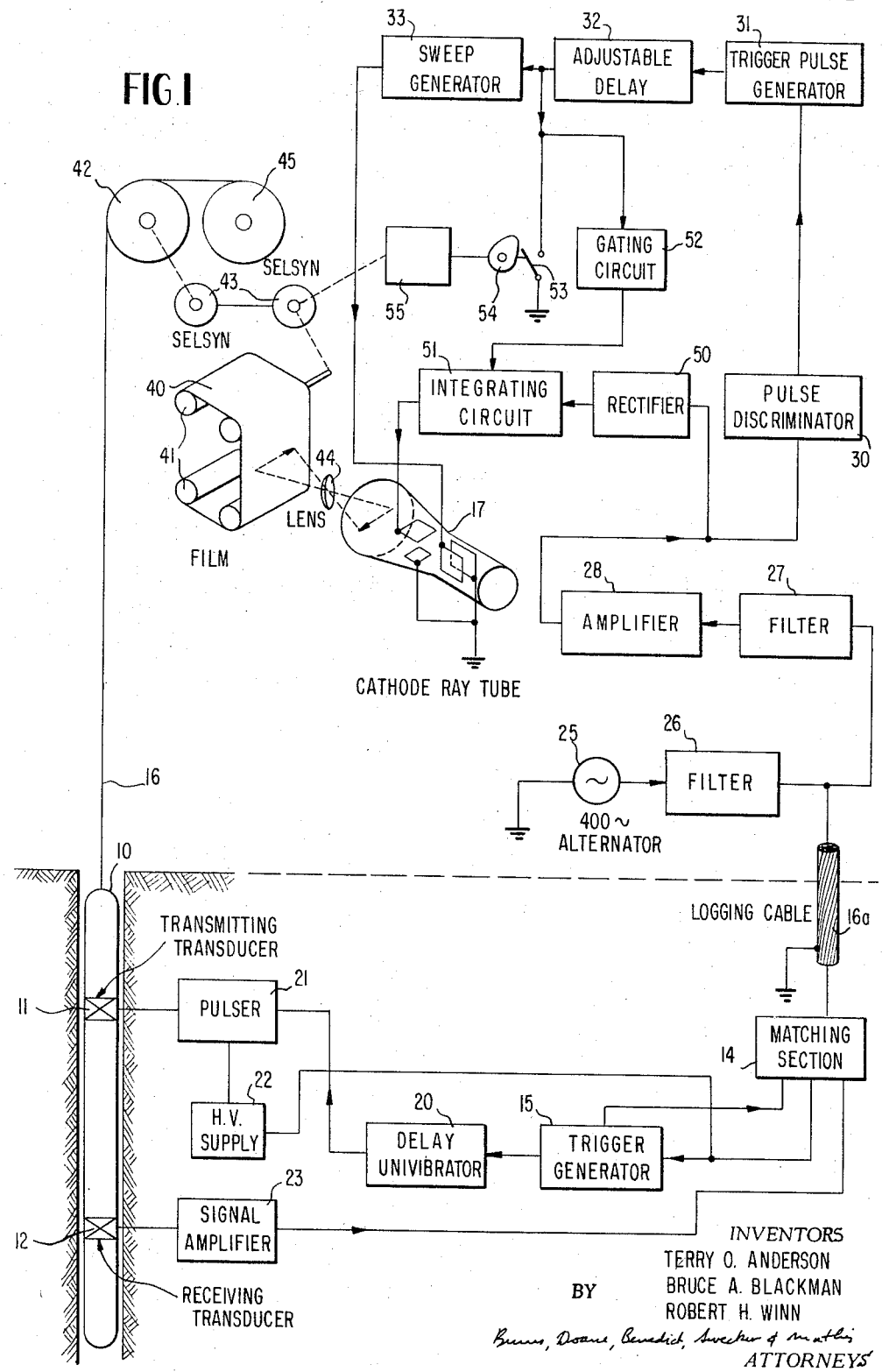
FIGURE 1 is a block diagram of a preferred system for the practice of the present invention.

The seismic logging system shown in FIGURE 1 includes a downwell sonde 10 having a transmitting electromechanical transducer 11 and, spaced therefrom by an insulating portion of the sonde, a mechanical-electrical transducer 12. The transmitting transducer 11 is recurrently excited and the transient acoustic signal received by receiving transducer 12 through the structures surrounding the well bore is conveyed to the surface installation immediately thereafter. In the system shown, this type of operation is achieved in response to signals supplied by the master synchronizing trigger generator 15 in the downhole instrumentation. It will be understood, however, that the trigger generator 15 could instead be included in the surface equipment.

Sonde 10 is supported for the logging operation by cable 16, also shown in enlarged section at 16a. In the embodiment shown, this cable comprises a single conductor which is insulated from the outer steel wire sheathing to form a type of concentric line. Synchronizing signals from trigger generator 15, the received information signals from transducer 12, and the downwell power are all transmitted through cable 16.

At the surface installation, oscilloscope 17 is provided for presenting the information signal as a visual pattern, which is preferably recorded continuously in correlation with depth measurements determined from the length of cable run down the bore hole.

It will be understood that the sweep presentation effected by oscilloscope 17 should be precisely correlated with the time phase at which the received signal is originated in transducer 12. Such synchronism may be secured by transmitting synchronizing pulses over the cable 16 in immediate coincidence with the responsive operation of the transmitting transducer 11 and with the beginning of the indicating cycle of the sweep circuit 36 for oscilloscope 17. Since such synchronizing signals tend to "ring out" in a prolonged transient oscillation which persists in the single transmission channel, or is coupled unavoidably thereinto if separate cable conductors are used, the information signals are preferably separated in time from the synchronizing signal by a predetermined phase delay. This permits accurate synchronism of the downwell received signal with the presentation of that information at the surface, but avoids any electrical interference between the synchronizing signal and the information signal. For this purpose, trigger generator 15 operates as a master timing control oscillator recurrently generating synchronizing signals. At the surface installation and at the sonde, the synchronizing signals are responded to after a predetermined phase delay to initiate operation of the transmitting transducer 11 and the indication cycle of the cathode ray oscilloscope. This phase delay may differ in various embodiments, but is preferably of sufficient duration to permit the transmission transients of the synchronizing signals to subside.

In the embodiment shown in FIGURE 1, as noted above, trigger generator 15 is included in the sonde instrumentation. It supplies simultaneous signals to a delay univibrator 20 and to the surface installation through matching section 14 and cable 16.

The delay univibrator 20 trigger pulser 21 which energizes the transmitting transducer 11 to emit a short impulse of mechanical energy from the sonde. Pulser 21 is energized from a high voltage supply 22 which may preferably be energized by an alternating voltage delivered by cable 16. Such voltage is conveniently supplied at 400 cycles. Matching section 14 includes suitable circuitry for the segregation of the power supply frequency from the synchronizing and information signals by means of suitable decoupling circiuts for the different frequency ranges involved. Matching section 14 also receives the signal from transducer 12 as amplified in the signal amplifier 23.

At the surface installation, power supply generator 25 is coupled to transmission line 16 through filter 26 which rejects the information and synchronizaion signals, presenting a high impedance thereto. At the same time, filter 26 efficiently transmits the power supply frequency, 400 cycles in this specific instance.

The synchronization and information signals, but not the power supply frequency, are delivered through filter 27 to amplifier 28.

In accordance with this invention, that portion of the output of amplifier 28 which represents the signals received by receiver 12 is employed to produce a unique well log by which attenuation characteristics and other information relating to the formations surrounding the well are sharply and dramatically represented. This is accomplished by recording a series of time and depth correlated lines on a moving record-receiving strip transverse to its length along a time base coordinate. The lines, each of which represents a preselected time period following the release of an impulse by the transmitting transducer 11, are deflected lengthwise of the record strip and orthogonally of the time base loci, in accordance with the instantaneous magnitude of a signal produced by the integration of the receiver signal characteristic. The result, as will be seen, is a well log characterized by a series of inclined lines. The slopes of portions of these lines are representative of signal attenuation characteristics in the formations surrounding the well bore. Changes in slope of these lines occur at the time of arrival of different energy modes, such as those of compression or shear. In addition to enabling the determination of attenuation characteristics of formations, such a formation dependent well log permits the location of fractures and other structural discontinuities by inspection and interpretation of the changes of slope of the lines which comprise the seismogram.

The output signal from amplifier 28 is a complex sequence. The synchronizing signal generated by trigger generator 15 in the sonde consists preferably of a high level pulse delivered through matching section 14 to cable 16. As delivered to amplifier 28, however, the cable transmission characteristics coupled with the transient operation of filters 26 and 27 under pulse signal incidence converts the generated pulse to a transiently damped wave train. The network essentially preserves the initiation phase of such signal with the output of trigger generator 15, with due respect to the transmission time through cable 16. The latter is essentially uniform and depends only on the total length of cable being employed in the logging operation. This damped wave train is first squared up in pulse discriminator 30 to supply a steeply rising output coincident in phase with the beginning, for instance, of a positive going initial portion of the original trigger signal generated in the sonde.

Preferably, pulse discriminator 30 may constitute a Schmitt trigger circuit operative to supply an output voltage at a uniform level during the persistence of an input voltage of positive polarity above a predetermined level. The operating characteristics of the pulse discriminator can generally be designed in any specific installation to supply a single pulse output with the desired leading edge phase. It may also respond to high signal level components of the same polarity during the subsequent information signal period, but this is rendered immaterial by the operation of trigger pulse generator 31 which is a monostable blocking oscillator with a sufficiently long recovery time as to remain insensitive throughout the subsequent information signal persistence, and relaxing to its steady state condition of sensitivity only shortly prior to the ensuing output from pulse discriminator 30 generated upon the next subsequent recurrence of the synchronizing signal from trigger generator 15.

The leading edge of the output from trigger pulse generator 31 establishes the beginning of a time delay period correlated with the delay of univibrator 20 in the sonde. For this purpose, its output is fed to adjustable delay circuit 32 which thereafter generates a delayed timing pulse after a predetermined selected time delay to initiate the horizontal sweep circuit 33 of the cathode ray tube 17. Sweep generator 33 is of the normally quiescent type generating a sweep voltage of predetermined amplitude and desired duration in response to an input synchronizing signal. The sweep signal, of course, represents the period of reception by receiver 12 selected for presentation following the release of an impulse by transmitter 11. Sweep presentation may be delayed, however, until a short time prior to the arrival of the first impulses at receiving transducer 12 to conserve the recording or indicating medium. This delay period is primarily a function of the physical distance between the two transducers 11 and 12. It is not, for all purposes, necessary to employ the entire succession of signal values developed by receiving transducer 12.

The well logs produced in accordance with this invention may be recorded on any suitable record-receiving strip. In the preferred embodiment, however, the cathode ray trace is photographically recorded on film 40 suitably driven on feed rolls 41 in correlation with the depth at which soundings are being taken. For this purpose, cable 16 may be run from the hoisting drum 45 over a sheave 42 which is coupled to the film drive mechanism by selsyns 43.

A suitable lens, diagrammatically shown at 44 is employed to project the oscilloscope image onto the film. By this means, as the cathode ray beam begins its sweep across the image screen of tube 17, a mark is initiated at a point adjacent the edge of the strip of film. Each mark starts preferably the same distance from the edge of the film at a reference point or line from which measurements may later be taken. Th mark moves continuously and linearly across the width of the film representing by its passage a period of reception by the downhole receiver 12 following the release of a signal impulse by the transmitter 11.

In accordance with this invention, the desired output signal characteristic from amplifier 28 is integrated in integrated circuit 51. It is usually convenient to rectify the signal before integration, and a full wave rectifier 50 is preferably employed for this purpose. The integrating circuit 51 may be of any form capable of accumulating a time integral of the desired signal characteristic presented to it.

The operation of the integrating network persists for the desired portion of the time during which received formation dependent signals are available from amplifier 28. This is accomplished by gating circuit 52, which supplies a control pulse of desired duration to unblock the integrator signal channel responsively to the generation of the keying pulse from delay generator 32, beginning simultaneously with each sweep operation performed by sweep generator 33. The duration of the gating pulse, like the sweep period, encompasses the desired period for evaluation of the received formation dependent signal. The integrated signal completely subsides during the interval between each successive integration.

The integrating circuit supplies a deflection signal to the vertical deflection plates of cathode ray tube 17 to deflect the cathode ray and, hence, the record line on strip 40 in a direction perpendicular to the sweep direction. If desired, time scale intervals may be recorded on the film as a series of lines spaced across its width. A suitably ruled graticule of transparent plastic (not shown) may be positioned adjacent the screen of oscilloscope 17 for this purpose. Either opaque or illuminated rulings may be employed.

It is also convenient to provide depth interval indications directly upon film 40 as it records the seismic signals. This may be effected by periodically interrupting presentation of logging information by oscilloscope 17. In the circuit shown, sweep action is suspended by grounding the sweep trigger voltage from delay generator 32 through switch 53. The latter is momentarily closed at cable pay-out intervals by a suitable cam shown diagrammatically at 54, coupled through gearing 55 to slave selsyn 43. This produces horizontal unexposed lines on the record strip.

The recording system herein provided for seismic well logging indicates individual integrated signal traces plotted adjacent one another against time coordinates of uniform scale. The indications are sufficiently spaced apart so that the integrated traces may generally be individually examined. Since, however, the variations in the formation may cause rapid changes in energy-related characteristics of the received seismic signal, under normal circumstances the log of a well will exhibit cross-overs or condensations of the readings such that individual traces may merge or obscure each other so that not every individual trace may be directly measured. On the other hand, it would be generally accurate to say that significant formation information may be derived from all portions of the logs of the present invention.

In the prints of the present logs, the traces are initiated at the left of the print as integration is commenced and the longitudinal position of each individual trace as initiated provides an arbitrary and uniform zero time calibration. Depending upon the system employed, the initiation of the trace is generally 200 or 300 micro-seconds subsequent to emission of the seismic impulse by the active transducer. This period before the initiation of integration will generally be selected with reference to the longitudinal separation between the transmitter and receiver in the sonde.

The time base locus for each integrated signal may be taken as a transverse line at right angles to the longer dimension of the log aligned with the signal trace at its point of origination. While the recording film is being continuously advanced, the entire trace is completed within a period of the order of 1,000 micro-seconds, so that for the purposes of practical mensuration, it is not considered necessary to compute with mathematical precision the travel of the film during the recording of a single trace. None the less, this would be a simple computation which could be achieved under any selected rate of film advance.

It will therefore be understood that at any selected point on the time scale, the accumulated integral is shown as the deflection of the trace orthogonally to the time base coordinate located for each trace as described above. The rate at which incoming energy or related characteristic of the seismic formation dependent signal occurs is reflected in the log as the slope of the indication at any specific time coordinate.

Reference has been made above to direct recordings of the raw signal detected from the formation at the receiver. In this type of recording, the trace density may be considerably higher, with relatively close positioning of subsequent adjacent traces, than is preferred for the integrated logs of the present invention. In case greater separation is desirable, the speed of the film advance may be increased, relative to the rate of travel of the sonde, or repetition rate at which the seismic pulses are generated by the active transducer may be decreased. Where it is desired simultaneously to record individually recognizable integrated traces and, on another film, more closely spaced raw signal data detected by the receiver, it may be desirable to omit, by a suitable auxiliary gate and count-down circuitry, alternate signals received in succession, so far as integrated recording is concerned. Under these circumstances, the raw data might, for instance, show signals taken and recorded at the rate of 30 per second, while half of these could be omitted from the integrated log.

Figure 2:
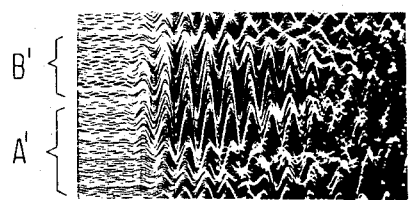
FIGURE 2 is a reproduction of a seismic well log produced by conventional deflection techniques.

In FIGURE 2 it is shown a seismic log reproducing the raw signal data detected by the receiver as in the prior art. The indication shows the signals as traces which are deflected alternately up and down Y axis in accordance with the instantaneous voltage of signals fed from the receiving transducer.

Figure 3:
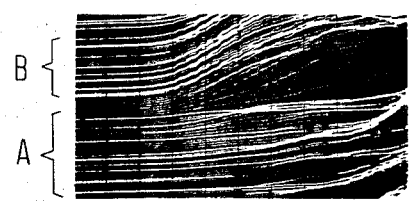
FIGURE 3 is a reproduction of a seismic well log produced in accordance with this invention.

By contrast, there is shown in FIGURE 3 an integrated seismic log produced in accordance with the present invention and characterizing the same section of well bore as is represented by the log in FIGURE 2. The unique characteristic of the individual traces of this integrated seismic log is immediately apparent. The deflection of each line is in a constant direction reflecting the continuous integration of the incoming signal characteristic. Note that certain traces, such as those in region A, have very low deflection and gradual slope, representing high attenuation of the seismic energy in the surrounding formation. By way of comparison, information of this nature is not at all readily determined by the corresponding region A' of FIGURE 2.

The integrated traces of FIGURE 3 in adjacent region B show a sharp and dramatic variation in the transmission characteristics of the formation at this point compared, to the transmission in region A. Here the attenuat ion is relative ly much lower for seismic energy. While similar data could probably be derived by a time consuming analysis of the log FIGURE 2 in region B', this rapid variation in attenuation characteristics of the formation is obviously far less apparent than in the log produced according to the present invention.

Figure 4:
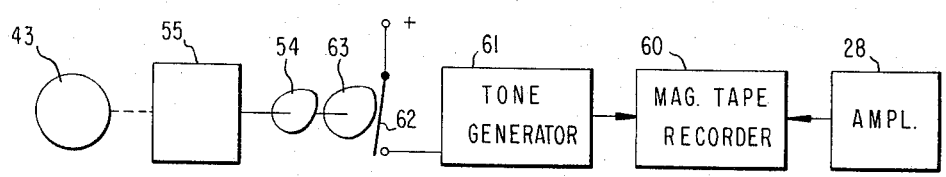
FIGURE 4 shows the application of the invention with a recording system.

As has been mentioned, the system of the present invention and the method of producing logs of the type shown in FIGURE 3, may be installed and performed at the well head. The raw data may be alternatively recorded magnetically, or otherwise, and later re-recorded to produce an integrated signal seismic log. In FIGURE 4 is shown in simplified schematic form a suitable recording system. This employs a magnetic tape recorder 60 receiving the seismic signal directly from amplifier 28. The frequency bands included in this signal are suitable for direct recording on magnetic tape without employment of a carrier wave or alternating current bias at the recording head.

As will be seen with reference to the circuit of FIGURE 1, the reproduced signal from the tape recorder may be fed to rectifier 50 and pulse discriminator 30 to reproduce the gating signals and synchronizing pulses for suitably operating cathode ray tube 17. On the other hand, the depth calibration markers caused by termination operation of the sweep generator and the gating circuit would be absent from a subsequently produced integrated seismic log.

While the indications of depth calibration could be supplied in a variety of ways, it is convenient to employ a tone generator 61 which is momentarily activated by closure of switch 62 under operation of cam 63 synchronized with the operation of cam 54 used in the instantaneous recording system. The tone pulses of generator 61 may be applied on a parallel tape track so that on reproduction, they will operate relay means for interrupting the operation of the recording sweep generator 33 in exactly the same manner as switch 53 operates in the system first described.

Figure 5:
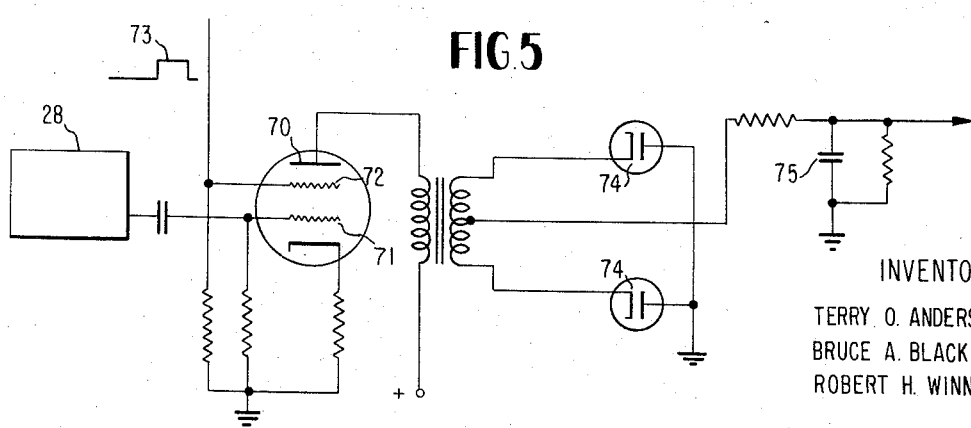
FIGURE 5 is a representative gated integrating circuit.

FIGURE 5 shows representative circuitry for integrating a signal applied from the amplifier. Here a dual grid tube 70 receives at grid 71 the seismic signal supplied from amplifier 28. This tube is normally cut off under the applied biases, and grid 72 receives a positive going gating pulse shown at 73, supplied by gating circuit 52 as above described. Thus, during the desired portion of the seismic signal, tube 70 transmits the same to full wave rectifier 74 for integration at condenser 75. The shunt and series resistors interconnected with condenser 75 are selected to provide a desirable charging time constant for accomplishing the integration, together with the necessary discharge time constant to reduce the voltage on the integrating condenser substantially to zero at the beginning of each subsequent integration.

From the foregoing it will be concluded that the objects of this invention have been obtained by a method and a system capable of yielding much valuable information in the graphical analysis of signals carrying information characterizing formations around well bores in particular. It will be understood that the invention is of broad utility.

While the preferred method and exemplary apparatus components of the present invention have been specifically described, it will be understood that modifications and variations may be made therein without departing from the scope of the invention as understood by those skilled in the art. All such variations and modifications as are within the spirit and scope of the invention in its broader aspects are encompassed in the appended claim.

We claim:

The seismic method of logging a well comprising:
(a) Producing an acoustical pulse in a borehole,
(b) Receiving said pulse at another location in said borehole,
(c) Converting the received pulse to a variable amplitude electrical signal which is the electrical analog of said pulse,
(d) Electrically integrating said signal,
(e) Displaying the instantaneous value of the integrated signal as a variable amplitude display along a horizontal time axis while it is being integrated,
(f) Cyclically repeating steps (a) to (e),
(g) Displaying successive integrated signals with the time axis parallel and spaced a distance from the time axis of the preceding signal display, and
(h) Displaying selected depths at which pulses were produced.

References Cited by the Examiner

UNITED STATES PATENTS

| | | | |
|---|---|---|---|
| Re. 25,928 | 12/1965 | Geyer et al. | 181—.5 X |
| 2,857,011 | 10/1958 | Summers | 181—.5 |
| 2,905,258 | 9/1959 | Broding | 181—.5 |
| 3,175,638 | 3/1965 | Hubbard et al. | 181—.5 |
| 3,252,131 | 5/1966 | Vogel | 181—.5 |

BENJAMIN A. BORCHELT, *Primary Examiner.*

W. KUJAWA, *Assistant Examiner.*